United States Patent [19]
Lundman

[11] Patent Number: 5,901,752
[45] Date of Patent: May 11, 1999

[54] INFLATABLE APPARATUS FOR SEALING A PIPELINE

[76] Inventor: Philip L. Lundman, 3631 Fredonia Kohler Dr., Fredonia, Wis. 53021

[21] Appl. No.: 09/092,421

[22] Filed: Jun. 5, 1998

[51] Int. Cl.⁶ ..................................................... F16L 55/12
[52] U.S. Cl. ............................................... 138/93; 138/89
[58] Field of Search .................................. 138/93, 90, 89

[56] References Cited

U.S. PATENT DOCUMENTS

| | | | |
|---|---|---|---|
| 1,690,995 | 11/1928 | Pratt ........................................... | 138/93 |
| 2,678,666 | 5/1954 | Theis et al. ................................ | 138/93 |
| 3,431,946 | 3/1969 | Sawyer ....................................... | 138/93 |
| 3,714,951 | 2/1973 | Lundman .................................. | 134/167 |
| 4,079,755 | 3/1978 | Van der Lans ........................... | 138/93 |
| 4,203,476 | 5/1980 | Vitellaro .................................... | 138/122 |
| 4,291,727 | 9/1981 | Yie ............................................. | 138/93 |
| 4,354,515 | 10/1982 | Sutherland ................................ | 134/167 |
| 4,413,653 | 11/1983 | Carter, Jr. .................................. | 138/93 |
| 4,467,835 | 8/1984 | Champleboux ............................ | 138/93 |
| 4,467,836 | 8/1984 | Ragout ....................................... | 138/93 |
| 4,565,222 | 1/1986 | Lundman .................................. | 138/93 |
| 4,614,206 | 9/1986 | Mathison et al. .......................... | 138/93 |
| 4,895,185 | 1/1990 | Champleboux et al. ................ | 138/109 |
| 5,353,842 | 10/1994 | Lundman .................................. | 138/93 |
| 5,379,802 | 1/1995 | Vander Lans .............................. | 138/93 |

FOREIGN PATENT DOCUMENTS 15413   7/1906   Norway .

*Primary Examiner*—Denise L. Ferensic
*Assistant Examiner*—James F. Hook
*Attorney, Agent, or Firm*—Michael Best & Friedrich

[57] ABSTRACT

A pipe sealing apparatus insertable inside a pipe and inflatable therein to prevent fluid flow through the pipe includes an elongated inflatable sleeve of elastomeric material and an elongated outer sleeve substantially surrounding the inflatable sleeve. The inflatable sleeve is shiftable with respect to the outer sleeve during inflation of the inflatable sleeves. An intermediate sleeve, shiftable with respect to each of the inflatable sleeve and outer sleeve, may be provided between the inflatable sleeve and the outer sleeve. The ends of the inflatable, intermediate, and outer sleeves may be folded and clampingly sealed to each other to provide a fluid-tight seal at opposite ends of the sealing apparatus. A flexible cylindrical member may extend through the inflatable sleeve between the opposite ends thereof, an inflatable space being defined between the cylindrical member and the inflatable sleeve.

37 Claims, 5 Drawing Sheets

INFLATABLE APPARATUS FOR SEALING A PIPELINE

BACKGROUND OF THE INVENTION

The present invention relates to an apparatus for sealing a pipeline section to prevent fluid flow through the pipeline and, alternatively, to clear obstructions in the pipeline. More particularly, the present invention relates to a pipe sealing apparatus that is insertable in pipelines of varying diameters and inflatable therein to seal a pipeline section. Such a pipe sealing apparatus is commonly referred to as an inflatable plug.

Inflatable plugs provide a quick and ready means to mitigate the uncontrolled release of fluids from a pipeline when a break occurs in the pipeline. One or more inflatable plugs may be used to isolate the break from the rest of the pipeline or isolate fluids held in the pipeline from the area of the break. Inflatable plugs are particularly helpful in the handling of liquid waste emergencies. For example, in the event of a liquid waste spill, inflatable plugs may be situated at the various surface entry points of a sewer system to prevent the liquid waste from escaping a designated containment area.

Inflatable plugs are also used to isolate sections of a pipeline when performing routine repair or maintenance on the pipeline. When replacing a valve, for example, a plug may be inserted into the pipeline upstream of the valve to thereby isolate the valve from the pipeline system and to allow for removal of the old valve. Inflatable plugs may also be used with existing pipeline valves to safely isolate an area where hot work is to be performed.

One type of inflatable plug is described in U.S. Pat. No. 4,565,222, which is assigned to the assignee of the present invention. The inflatable plug described there includes an inflatable bag of flexible sheet material that is constructed to form an elongated cylinder. The ends of the inflatable plug are wrapped around rigid end supports and then metal collars are placed over the ends of the inflatable plug. The metal collars are swaged or clamped down to form a fluid tight seal between the end supports and the collars. One of the rigid end supports includes an open pipe connectable to a pressurized air or water supply. The plug is inserted into the pipeline in the deflated state and maneuvered into the desired section of the pipeline. Pressurized air or water is then delivered through the open pipe to fill the inflatable bag. The inflatable bag expands to fill the pipeline section and frictionally engages the inside wall of the pipeline section, thereby sealing or plugging the pipeline.

Another type of inflatable plug may be used to clear a blockage inside a pipeline as well as to seal the pipeline. Such an inflatable plug is commonly referred to as a flow-through type inflatable plug. An example of a flow-through inflatable plug is described in U.S. Pat. No. 5,353,842, which is also assigned to the assignee of the present invention. The inflatable plug shown there includes an elongated cylinder with a central, longitudinal bore and an expandable covering surrounding the central cylinder. The expandable covering is comprised of an elastomeric material which is wrapped around the cylinder. At one end of the inflatable plug, a first fluid inlet is provided for delivering pressurized air or water between the outer surface of the cylinder and the inner surface of the covering and a second fluid inlet is provided for delivering pressurized fluid to the cylinder bore. When the plug is inserted in a pipeline adjacent a pipe blockage, the first fluid inlet is used to inflate and expand the space between the covering and the cylinder, such that the outer surface of the plug sealingly engages the inside surface of the pipeline section. Then, pressurized fluid is delivered through the second fluid inlet and into the cylinder bore. This pressurized fluid is discharged at the opposite end of the cylinder bore in the direction of the pipe blockage, thereby clearing the blockage from the pipe.

SUMMARY OF THE INVENTION

Since facilities which employ inflatable plugs typically have a variety of pipelines, it is desirable to provide inflatable plugs which are capable of expanding over a wide range of sizes and sealing a wide range of pipeline diameters. Of course, such inflatable bags or coverings must also possess the strength necessary to retain pressurized fluid and resist punctures and abrasions. It has been found, however, that elastomeric materials having high strength and the ability to withstand high pressures also tend to be relatively inelastic and, thus, exhibit reduced expansion capability. On the other hand, elastomeric materials which exhibit high expansion capability tend to have a lower tear resistance and ultimate strength.

In some applications, it may be necessary to insert the plug vertically downward through an opening in the pipe wall and then turn the plug 90° so that it can be inserted horizontally into the pipe. If the plug is too large or is relatively inflexible, such manipulation of the plug can be difficult. Accordingly, it is desirable to provide plugs which have a relatively small deflated diameter and are relatively flexible and maneuverable when inserted in a pipeline. At the same time, the inflatable plug or covering must possess puncture resistant properties as it is often bent and navigated over sharp obstructions in the pipeline.

It is also desirable for the outer surface of the inflatable bag or covering to exhibit a high coefficient of frictions. When the plug is sealingly engaged with the inside surface of a pipeline section, it may be subjected to high pressures in the pipeline, or, in the case of a flow-through plug, may be subjected to considerable thrust loads. Accordingly, the frictional engagement between the outer surface of the inflatable bag or covering and the inside surface of the pipeline section must be sufficient to maintain the inflatable plug in place and to completely seal the interface between the outer surface of the inflatable bag and the inside surface of the pipeline section.

The above-discussed attributes are just some of the attributes desirable of an inflatable plug, or, more particularly, of an inflatable bag or covering. Other desirable attributes include but are not limited to the following: high resistance against temperature variations, wide range of chemical compatibility, ultra-violet protection, light weight, and cost effectiveness. Since it is difficult to find one material for the inflatable bag or covering which exhibits the necessary physical properties to provide all of these attributes in an inflatable plug, the design of prior art inflatable plugs typically involved design compromises which produce an inflatable bag or covering exhibiting only some of the more desirable and obtainable physical attributes.

The general object of the present invention is to provide an inflatable plug or pipeline sealing apparatus that exhibits the above-described desirable physical attributes. In this respect, the pipeline sealing apparatus embodying the invention is a vast improvement over prior art inflatable plugs. Among other attributes, the present pipe sealing apparatus has a relatively small deflated diameter in comparison to many prior art inflatable plugs. At the same time, the pipe sealing apparatus exhibits increased air retention and expansion capabilities, as well as high strength and puncture resistance. Further, the pipe sealing apparatus is easily insertable and maneuverable in a pipeline and displays excellent friction holding and sealing capabilities when in the inflated state.

In general, the pipe sealing apparatus embodying the invention is insertable inside a pipe and inflatable therein to prevent fluid flow through the pipe. The pipe sealing apparatus has a first support member disposed at a first end and a second support member disposed at a second end. An elongated inflatable sleeve and an outer sleeve substantially surrounding the inflatable sleeve extend between the first and second support members. In several alternative embodiments, at least one of the support members is provided by an end pipe, a plug, or one end of an elongated central cylinder extending through the first and second ends of the pipe sealing apparatus. In yet another embodiment, one of the support members is an assembly including a central end pipe, a threaded nipple mounted concentrically about and spaced from the end pipe, and a reducer fitting joining one end of the threaded nipple with the outer surface of the end pipe.

The inflatable sleeve has a first sleeve end that sealingly engages the first support member and a second sleeve end that sealingly engages the second support member. An inner surface of the inflatable sleeve extends between the first and second inflatable sleeve ends and substantially defines an expandable inflatable space or bladder therein. An outer surface also extends between the first and second inflatable sleeve ends.

A fluid supply inlet (e.g., a threaded bore or pipe) may be provided in fluid communication with the inflatable space and operable to deliver fluid (e.g., compressed air) into the inflatable space to inflate the inflatable space. The fluid supply inlet may be disposed at the first end of the pipe sealing apparatus. The fluid supply inlet is typically used to inflate the pipe sealing apparatus after the apparatus is inserted into the pipe. Alternatively, the pipe sealing apparatus may be partially or fully inflated prior to being inserted into the pipe and then forced by manual or mechanical means further into the pipe to seal against the inside walls of the pipe. Because the pipe sealing apparatus embodying the invention is flexible, it is easier to maneuver the apparatus inside the pipe.

The outer sleeve has a first outer sleeve end, a second outer sleeve end, and an inner surface. The inflatable sleeve is positioned such that the outer surface of the inflatable sleeve is shiftable with respect to the inner surface of the outer sleeve during inflation of the inflatable space. Thus, the inflatable sleeve is movable relative to the outer sleeve and moves (i.e., expands and retracts) substantially independently from the outer sleeve, during inflation and deflation of the inflatable space. A first securing means is provided to secure the first outer sleeve end about the first end of the pipe sealing apparatus and to form a fluid tight seal between the first support member and the first outer sleeve end. A second securing means is provided to secure the second outer sleeve end about the second end of the pipe sealing apparatus and to form a fluid tight seal between the second support member and the second outer sleeve end. In one form of the invention, the securing means includes at least one annular band (e.g., a swaged collar or hose clamp) that is clampingly engaged around one of the first and second outer sleeve ends and forms a fluid tight seal around one of the first and second support members.

In one aspect of the invention, at least one of the first and second inflatable sleeve ends forms a set of folds (or pleats) wrapped around one of the first and second support members when viewed in cross sections generally perpendicular to the longitudinal axis. Further, at least one of the first and second outer sleeve ends forms a second set of folds (or pleats) wrapped around the first set of folds when viewed in cross sections generally perpendicular to a longitudinal axis of the pipe sealing apparatus. Preferably, the first set of folds forms a first ring of folds around one of the first and second support members and the second set of folds forms a second ring of folds positioned radially outward from the first ring of folds. In this way, the folds of the first ring do not fold over the folds of the second ring. Such a folding method and configuration produces an inflatable middle section of the pipe sealing apparatus that expands and collapses rather easily, and has a relatively small deflated diameter when compared to prior art inflatable plugs.

A unique feature and advantage of the pipe sealing apparatus is that the materials and construction for the inflatable sleeve and the outer sleeve may be varied and customized to produce pipe sealing apparatuses having specific combinations of physical attributes. In one particular embodiment of the invention, the inflatable sleeve is constructed from an elastomeric material having excellent expansion and air retention capabilities. One suitable material is a nylon material that includes a polyurethane coating. The outer sleeve, on the other hand, may be constructed from a material that is substantially inelastic relative to the elastomeric material (e.g., a treated cotton canvas material) from which the inflatable sleeve is constructed, but which exhibits high strength, chemical compatibility, and a high coefficient of friction.

In another aspect of the invention, the pipe sealing apparatus further includes at least one elongated middle sleeve substantially surrounding the inflatable sleeve and disposed between the inflatable sleeve and the outer sleeve. The material for the middle sleeve may also be selected to suit specific operational needs. In one particular embodiment, the elongated middle sleeve is constructed of ballistic nylon material.

In yet another aspect of the invention, the pipe sealing apparatus is of the flow-through type and further includes a flexible cylinder aligned with the longitudinal axis. The cylinder has a first cylinder end and a second cylinder end. The two cylinder ends define an outer surface therebetween and a cylinder bore providing a fluid passage extending through the first and second ends of the pipe sealing apparatus. The inner surface of the inflatable sleeve and the outer surface of the cylinder substantially define the inflatable space or bladder. Preferably, the first support member includes a first tubular member having a first end passage therethrough and the second support member includes a second tubular member having a second end passage therethrough. The cylinder bore is disposed in fluid communication with both the first end passage and the second end passage.

It is a unique feature and advantage of the present invention to provide a pipe sealing apparatus having a basic construction and design which may be easily customized or modified to attain a specific combination of physical attributes depending on the demands of the intended operating environment.

It is a feature and an advantage of the present invention to provide a pipe sealing apparatus that is easy to assemble.

It is a feature and an advantage of the present invention to provide a pipe sealing apparatus that is simple in construction and easy to use.

DETAILED DESCRIPTION OF THE DRAWINGS

Figure 1:
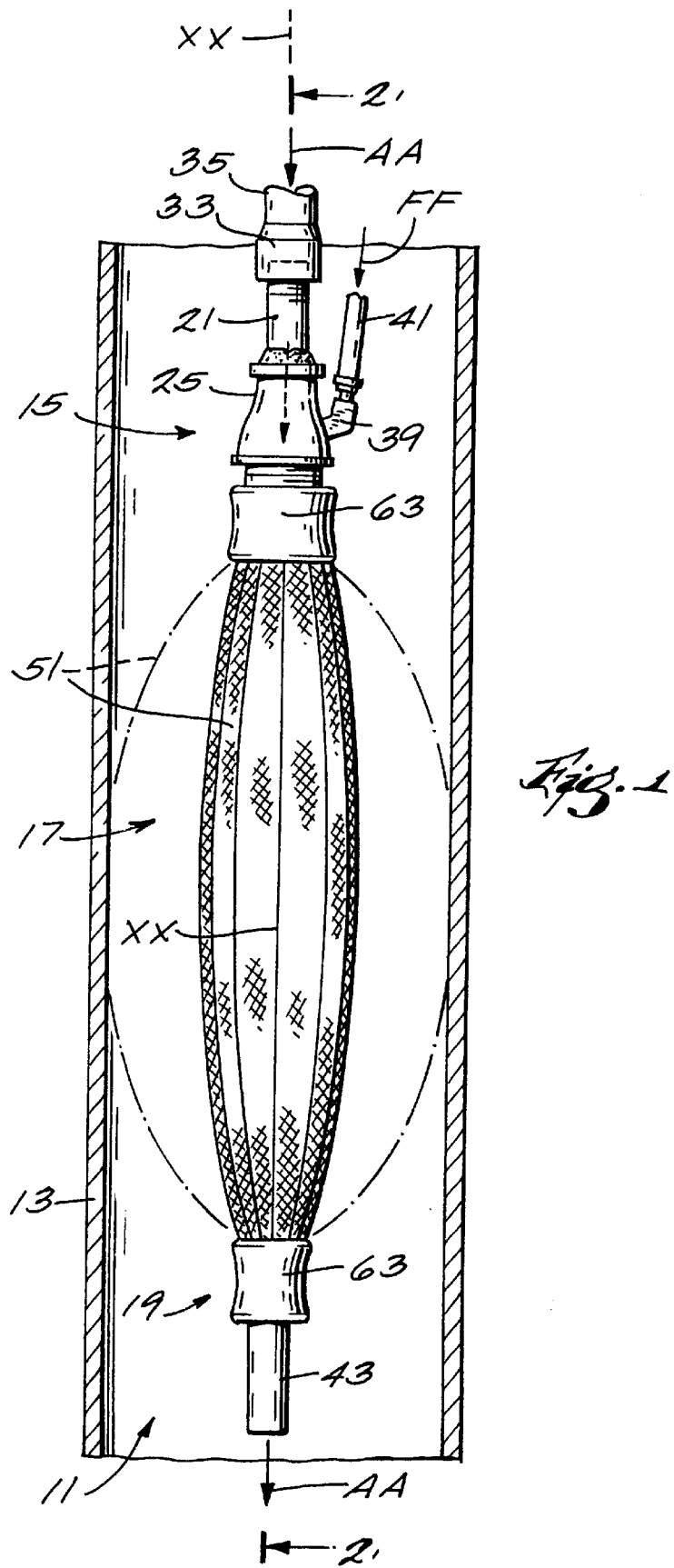
FIG. 1 is a lateral view of a pipe sealing apparatus embodying the invention, and shown inserted in a section of a pipeline and in the deflated state.

FIGS. 1–4 depict a pipe sealing apparatus 11 embodying the present invention. More specifically, FIG. 1 depicts a pipe sealing apparatus 11 of the flow-through type shown housed in a section of pipeline 13 and in the deflated state. The pipe sealing apparatus 11 is generally an elongated body having a rigid leading end 15, an expandable and flexible middle section 17, and a rigid trailing end 19. Each of the leading end 15, the trailing end 19, and the middle section 17 is positioned about a common longitudinal axis XX of the pipe sealing apparatus 11.

Figure 2:
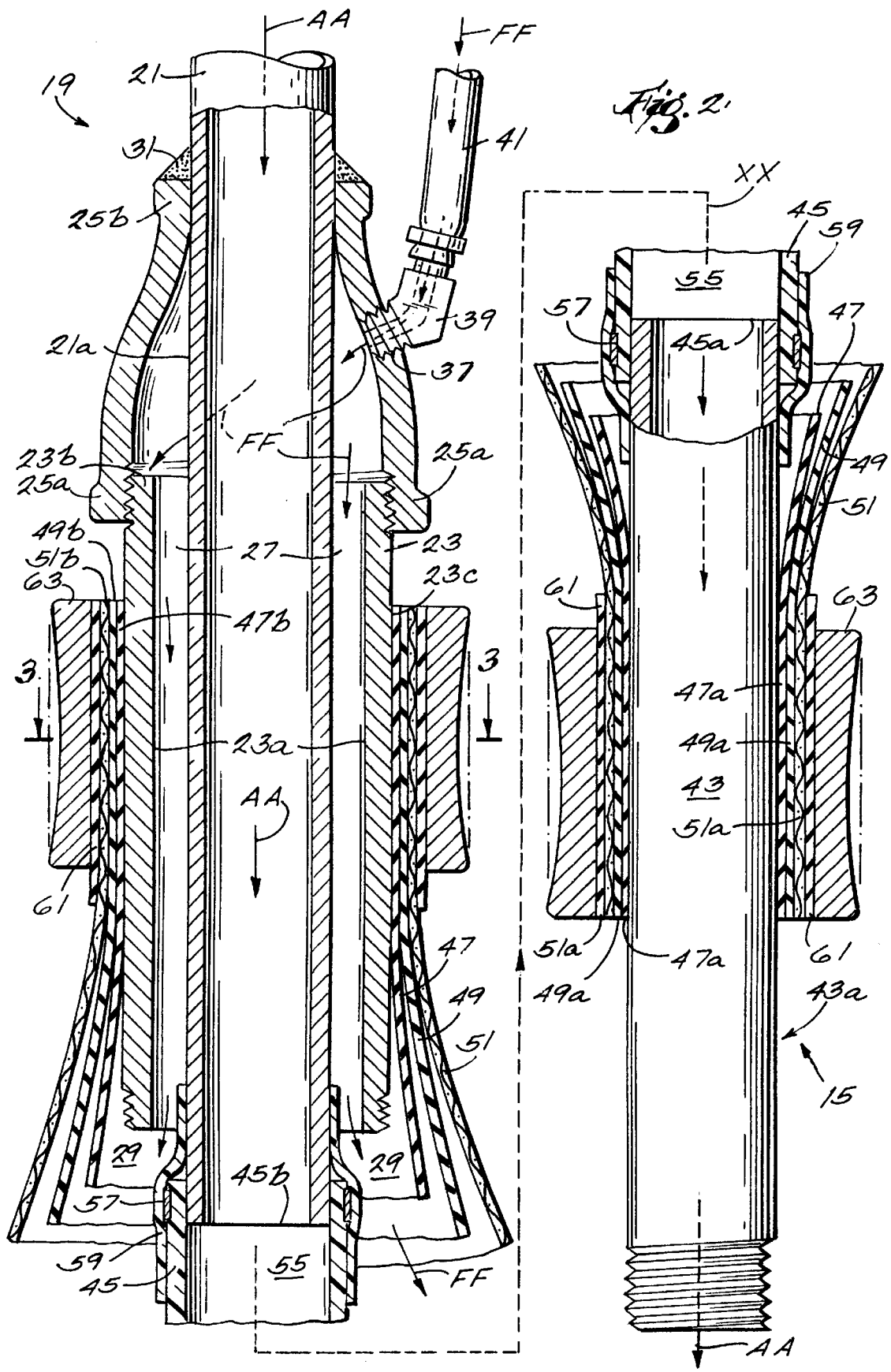
FIG. 2 is a lateral sectional view of the pipe sealing apparatus through line 2—2 of FIG. 1.

Referring now to FIG. 2, the trailing end 19 is formed by a small-diameter end pipe 21 that extends axially outward from the middle section 17, a larger-diameter threaded nipple 23 that is mounted concentrically about the end pipe 21, and a concentric bell reducer 25 that is joined to both the threaded nipple 23 and an outer surface 21a of the end pipe 21. The threaded nipple 23 is sized relative to the end pipe 21 such that an inside surface 23a of the threaded nipple 23 is spaced radially outward from the outer surface 21a of the end pipe 21, thereby creating a cylindrical channel 27 therebetween. As will be explained below, one end of the cylindrical channel 27 opens into an inflatable space or bladder 29 enclosed within the middle section 17. The opposite end of the cylindrical channel 29 is closed and sealed by the bell reducer 25. Further, an enlarged end 25a of the bell reducer 25 is threadedly connected to an outer end 23b of the threaded nipple 23 while a reduced end 25b is joined by a groove weld 31 to the outer surface 21a of the end pipe 21. In this way, the outer end of the cylindrical channel 27 is sealed. The end pipe 21 extends axially past the reduced end 25b of the bell reducer 25 and is fitted to a coupling 33 (see FIG. 1). The coupling 33 is connectible to a flexible conduit 35 that leads from an external supply (not shown) of a pressurized fluid AA such as a high-pressure water line or air line.

A threaded bore or inlet 37 is provided through the bell reducer 25. The threaded inlet 37 is disposed in open communication with the cylindrical channel 27 and is fitted with a compression fitting assembly 39 onto which a high-pressure flexible conduit 41 (i.e., a rubber hose) is connected. The flexible conduit 41 is connectible with an external pressurized fluid (not shown) such as compressed air which, as will be explained below, is used to deliver pressurized fluid FF to the cylindrical channel 27 and into the inflatable bladder 29.

Referring to both FIGS. 1 and 2, the leading end 15 of the pipe sealing apparatus 11 comprises a second end pipe 43 that supports one end of the middle section 17. Preferably, the end pipe 43 is positioned co-axially with the end pipe 21 of the trailing end 19. Unlike at the trailing end 19, however, the end of the middle section 17 is secured against an outer surface 43a of the end pipe 43, thereby sealing that end of the middle section 17.

Referring to FIG. 2, the middle section 17 of the pipe sealing apparatus 11 includes a central flexible cylinder 45, an inflatable sleeve 47 which surrounds the flexible cylinder 45, and a pair of concentric sleeves 49, 51 which surround the inflatable sleeve. As will be explained in detail below, the ends of the three sleeves 47, 49, 51 are clampingly engaged in fluid-tight relation around an outer surface of the end pipe 43 and an outer surface 23a of the threaded nipple 23 respectively In this regard, the end pipe 43, 23 and the threaded nipple 23 function as rigid end supports for the middle section 17. In between the end supports 43, 23, the three sleeves 47, 49, 51 form separate and distinct layers of the expandable middle section 17. The advantages provided by such multiple layers or sleeves will become readily apparent with the description provided below.

The flexible cylinder 45 extends between the leading end 15 and the trailing end 19 of the pipe sealing apparatus 11. The flexible cylinder 45 has a leading end 45a, a trailing end 45b, an outer surface 53 defined between the two ends 45a, 45b, and a central longitudinal bore 55. The cylinder 45 is preferably a rubber hose or the like that is rated for moderate to high-pressure duty, and provides both support and flexibility to the pipe sealing apparatus 11. The flexibility of the cylinder 45 allows the pipe sealing apparatus 11 to be easily manipulated around bends and restrictions in the pipeline 13 section, but also provides support and strength to the apparatus 11.

At the trailing end 19 of the pipe sealing apparatus 11, the end pipe 21 is received in the cylinder bore 55 and is sealingly secured therein. Referring to FIG. 2, the end pipe 21 and the cylinder 45 are sealingly engaged by securing an annular band or ring 57 around the trailing end 45b of the flexible cylinder 53 and wrapping the interface between the end pipe 21 and the trailing end 45b of the flexible cylinder 53 with duct tape 53. Similarly, at the leading end 15 of the pipe sealing apparatus 11, the cylinder bore 55 receives the end pipe 43, and the leading end 45a of the flexible cylinder 45 and the end pipe 43 are sealingly engaged using an annular band or ring 57 and duct tape 59. Thus, pressurized fluid AA (e.g., water or air) may be delivered into the cylinder bore 55 through the end pipe 43, and then discharged out through the end pipe 21 at the leading end of the pipe sealing apparatus 11.

In alternative embodiments, the end pipes 21, 43 may be integrally formed with or replaced by the cylinder ends 45a, 45b of the flexible cylinder 45. For example, the bell reducer 25 may be supported directly on the cylinder end 45b. In any event, the flexible cylinder 45 provides support to both the trailing end 19 and the leading end 21 of the pipe sealing apparatus 11.

The inflatable sleeve 47 and the outer surface 53 of the cylinder 45 define the inflatable, expandable space or bladder 29 therebetween which is capable of receiving and retaining pressurized fluid FF. The inflatable sleeve 47 is preferably constructed of an elastomeric, gas-impermeable material and is generally thinner than prior art inflatable bags and coverings, but exhibits increased flexibility and expandability. In the embodiment depicted in FIGS. 1–4, the inflatable sleeve 47 is constructed of a nylon material that is applied with a polyurethane coat. The nylon sleeve 47 is relatively thin and lightweight. In the inflated state, the inflatable sleeve 47 is provided added support by the middle and outer sleeves 49, 51 and, thus, the inflatable sleeve 47 is also highly resistant to punctures and has adequate strength to retain pressurized fluid FF.

Alternatively, the inflatable sleeve 17 may be constructed from a variety of materials exhibiting a range of physical properties. A sample list of suitable materials include surlyn™, plastic sheet vinyl, urethane, or fabric impregnated with neoprene. Surlyn is a trademark of Dow Chemical Company. The inflatable sleeve 17 may also be comprised of one or more layers or plies of material depending on such conditions as the pressure to which the inflatable sleeve 47 will be subjected in service. Because the inflatable sleeve 47 of the present invention is surrounded by one or more concentric sleeves, such material properties as wear resistance, puncture resistance, chemical compatibility, and ultra-violet radiation resistance may be compromised in the design of the inflatable sleeve 47. Accordingly, these material properties do not greatly limit the selection process for the material for the inflatable sleeve 47. Instead, other attributes particular to the inflatable sleeve 47, such as flexibility, expandability, cost-effectiveness, thickness, and light weight, are maximized.

In one form of the invention, the inflatable sleeve 47 is formed from an elongated rectangular sheet of flexible material. The sheet is cut and the elongated edges of the rectangular sheet are joined together along a fluid-tight seam, thereby creating an elongated cylinder. If the sheet comprises a material such as vinyl, the edges may be sealed together using a conventional ultrasonic or heat sealing apparatus. When a nylon fabric is used, the edges are preferably sealed using radio frequency welding.

Figure 3:
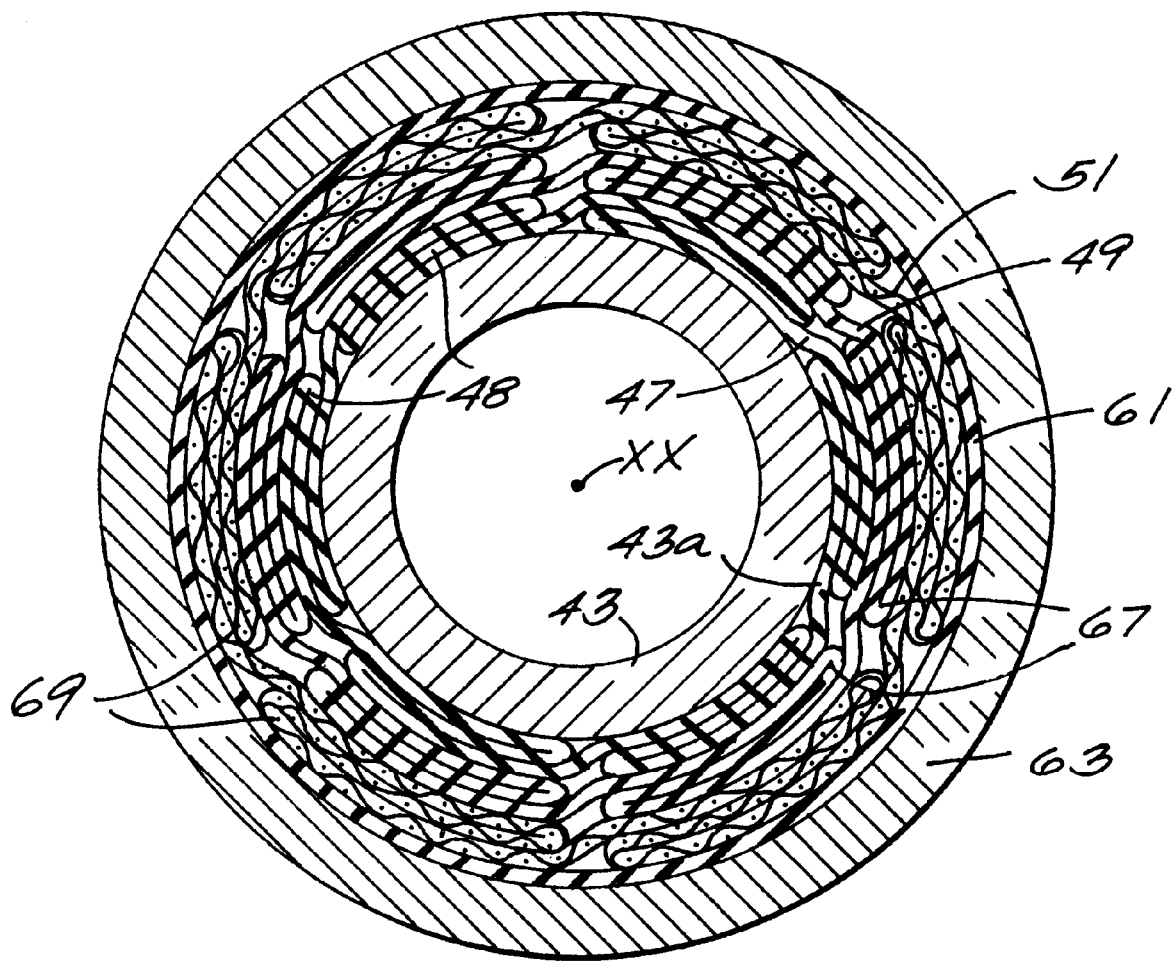
FIG. 3 is a cross sectional view of the pipe sealing apparatus through line 3—3 of FIG. 1.
Figure 4:
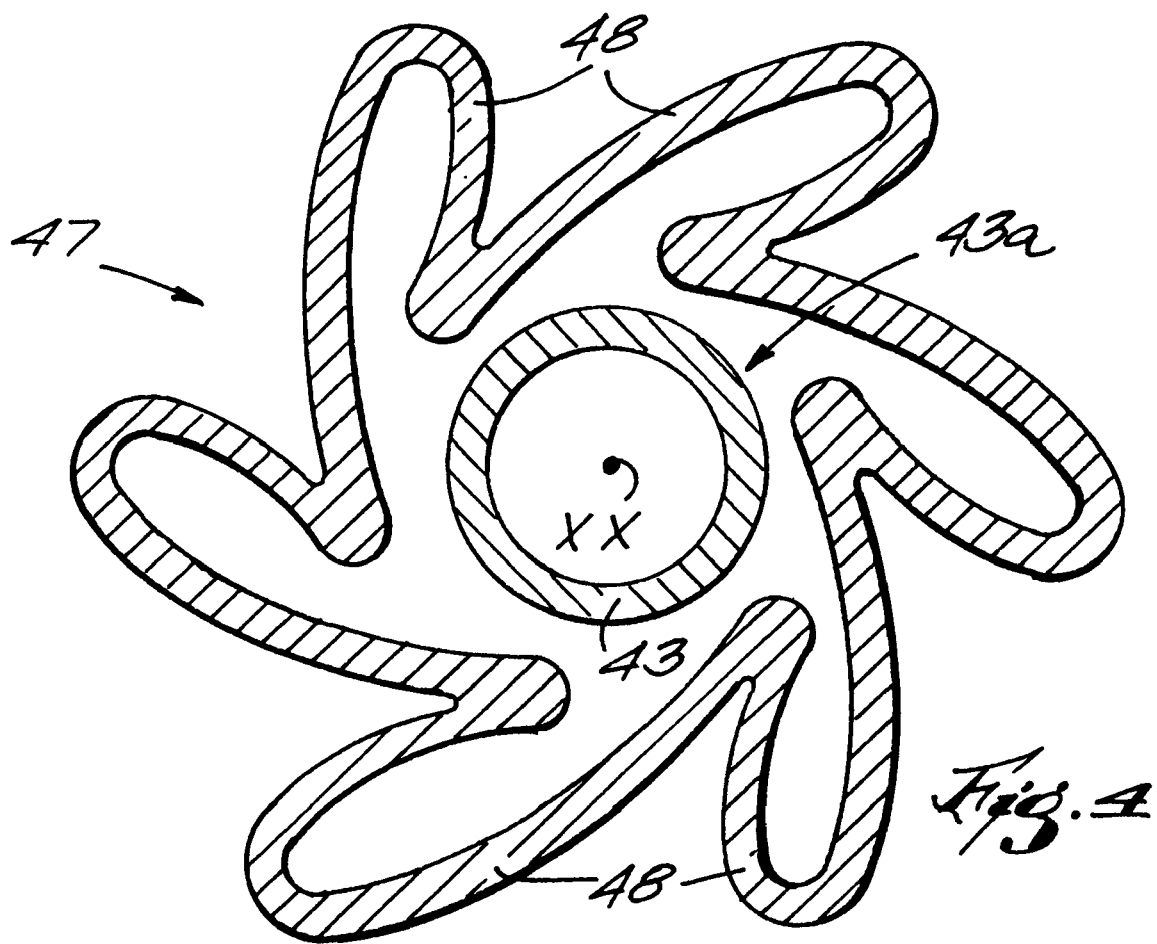
FIG. 4 is a cross sectional view of the pipe sealing apparatus shown in FIG. 1 and illustrating the pattern by which one end of an inflatable sleeve is folded and secured.

Referring to FIG. 4, the leading end 47a and trailing end 47b of the inflatable sleeve 47 are folded to form a number of pleats 48 which extend generally parallel to the longitudinal axis XX of the pipe sealing apparatus 11. When the inflatable sleeve 47 is deflated from an inflated state, it folds over the pleats 48 to form a plurality of longitudinal folds. The folds fold over their respective pleats 48 in the same direction, so that the inflatable sleeve 47 can collapse to a more slender configuration. At each end 15, 19 of the inflatable sleeve 47, the pleats 48 are folder over on top of each other and then wrapped around the outer surface 43a of the end pipe 43 (as also shown in FIG. 3) and the outer surface 23c of the threaded nipple 23 respectively. In one form of the invention, the direction and the extent of the folds are maintained by clips that fasten to the inflatable sleeve 47 from one side of each fold to the other side of the fold. This folding method and pattern is described in present assignee's U.S. Pat. Nos. 4,565,222 and 3,714,951, hereby incorporated by reference.

The middle sleeve 49 is preferably constructed of a material having properties which emphasize, among other attributes flexibility, strength, and puncture resistance. In one form of the invention, the middle sleeve 49 is constructed from a ballistic nylon material that is pleated and folded separately from the inflatable sleeve 47 using the same method and pattern employed for the inflatable sleeve 47 (as described above). Thus, the middle sleeve 49 also collapses to a state wherein the deflated diameter is minimized. As shown in FIG. 3, the folds or pleats 67 of the middle sleeve 49 are spirally-wrapped around the pleats of the inflatable sleeve 47 and around the end pipe 43. Since the middle sleeve 49 is pleated and folded separately from the inflatable sleeve 47, the pleats 48 of the inflatable sleeve 47 do not fold over the pleats 67 of the middle sleeve 49.

The outer sleeve 51 of the pipe sealing apparatus 11 surrounds the middle sleeve 49 and includes leading and trailing ends 51a, 51b which are secured around the end pipe 43 and the threaded nipple 23 respectively. The outer sleeve 51 is preferably constructed of a material that emphasizes such physical properties as high strength, wear resistance, puncture resistance, temperature resistance, chemical compatibility, and ultra-violet radiation resistance. Moreover, the outer surface of the outer sleeve 51 exhibits a high coefficient of friction. When the pipe sealing apparatus 11 is in the inflated state, the frictional engagement between the outer surface of the outer sleeve 51 and the inside surface of the pipeline 13 is sufficient to resist thrust loads and pressure which act on either side of the pipe sealing apparatus 11. In one form of the invention, the outer sleeve 51 is constructed of a treated cotton canvas material.

Now returning to FIGS. 2 and 3, the ends 51a, 51b of the outer sleeve 51 are similarly pleated and folded around end pipe 43 and the threaded nipple 23, as described previously but after the middle sleeve 49 and the inflatable sleeve 47 are pleated and folded. As shown in FIG. 3, pleats 69 of the outer sleeve 51 are wrapped around the pleats 67 of the middle sleeve 49. The pleats 67 of the middle sleeve 49 do not fold over or into the folds or pleats 69 of the outer sleeve 51.

Referring to FIG. 2, an elastomeric band 61 is wrapped around the spirally-wrapped ends 51a, 51b of the outer sleeve 51, thereby securing the respective ends of the outer, middle and inflatable sleeves 47, 49, 51 against the outer surfaces 43a, 23c of the end pipe 43 and threaded nipple 23 respectively. Annular clamping means 63 is also provided for clamping the spirally-wrapped folded ends 47a, 49a, 51a radially inward against the outer surface 23c of the threaded nipple 23. Such clamping means 63 provide a fluid tight joint or seal around the threaded nipple 43. Another clamping means 63 is similarly fitted around the outer surface 43a of the end pipes. In the embodiment depicted in FIGS. 1–4, an aluminum or other relatively soft metal sleeve or band 63 is slipped over each folded end 51a, 51b of the outer sleeve 51, and then the aluminum band 63, is swaged down to a reduced diameter. The aluminum band 63 clampingly engages each folded end 51a, 51b to form the required fluid tight seal. In an alternative embodiment, the clamping means 63 may be provided by one or more hose clamps.

FIG. 3 provides a cross sectional view of the pipe sealing apparatus through the aluminum band 61 and the folded end 51b, 49b, 47b of the outer, middle, and inflatable sleeves 51, 49, 47. As shown therein, the folded ends 51b, 49b, 47b of the folded sleeves 51, 49, 47 are wrapped around each other and the end pipe 23 in a fluid tight manner. Applicant has discovered that such a folding pattern produces a pipe sealing apparatus 11 having an expandable middle section 17 characterized by a reduced diameter when in the deflated state and which expands and collapses easily. Moreover, applicant has discovered that the method of pleating and folding the sleeves 47, 49, 51 separately also produces a smaller-diameter middle section 17, as opposed to a method wherein two or more of the sleeves are folded together.

The pipe sealing apparatus 11 is inserted into the pipeline 13 while in the deflated state and maneuvered to the desired location in the pipeline as shown in FIG. 1. Then, pressurized fluid FF is delivered through the threaded inlet 37 and the cylindrical channel 27 and into the inflatable bladder 29. Fluid pressure in the inflatable bladder 29 causes the inflatable sleeve 47 to expand radially outward from the outer surface 53 of the cylinder 45 and to expand the middle section 17 of the pipe sealing apparatus 11. Expansion of the inflatable sleeve 47 is received in the space between the inflatable sleeve 47 and the middle sleeve 49 and the space between the middle sleeve 49 and the outer sleeve 51. As described previously, the fold patterns of the middle and outer sleeves 49, 51 allow these sleeves 49, 51 to expand from a deflated state wherein the sleeve diameters are minimized to an inflated state accommodating radially outward expansion of the inflatable sleeve 47. The inflated state of the pipe sealing apparatus 11 is depicted in FIG. 1 in dash lines. In the inflated state, the outer surface of the outer sleeve 51 sealingly engages the pipeline 13.

The pipe sealing apparatus 11 illustrated in FIG. 1 may also be used to clear blockage in the section of pipeline 13. After the pipe sealing apparatus 11 is sealingly situated in the pipeline 13, fluid AA is delivered to the cylinder 45 using the end pipe 21 at the trailing end 19 and then discharged through the end pipe 43 at the leading end 15. The accumulation of fluid AA therein generates fluid pressure between the blockage and the pipe sealing apparatus 11 which acts to push away or dissipate the blockage in the pipeline 13. Meanwhile, frictional engagement between the outer sleeve 51 and the pipeline 13 resists pressure acting on the pipe sealing apparatus 11 and prevents the pipe sealing apparatus 11 from slipping.

Figure 5:
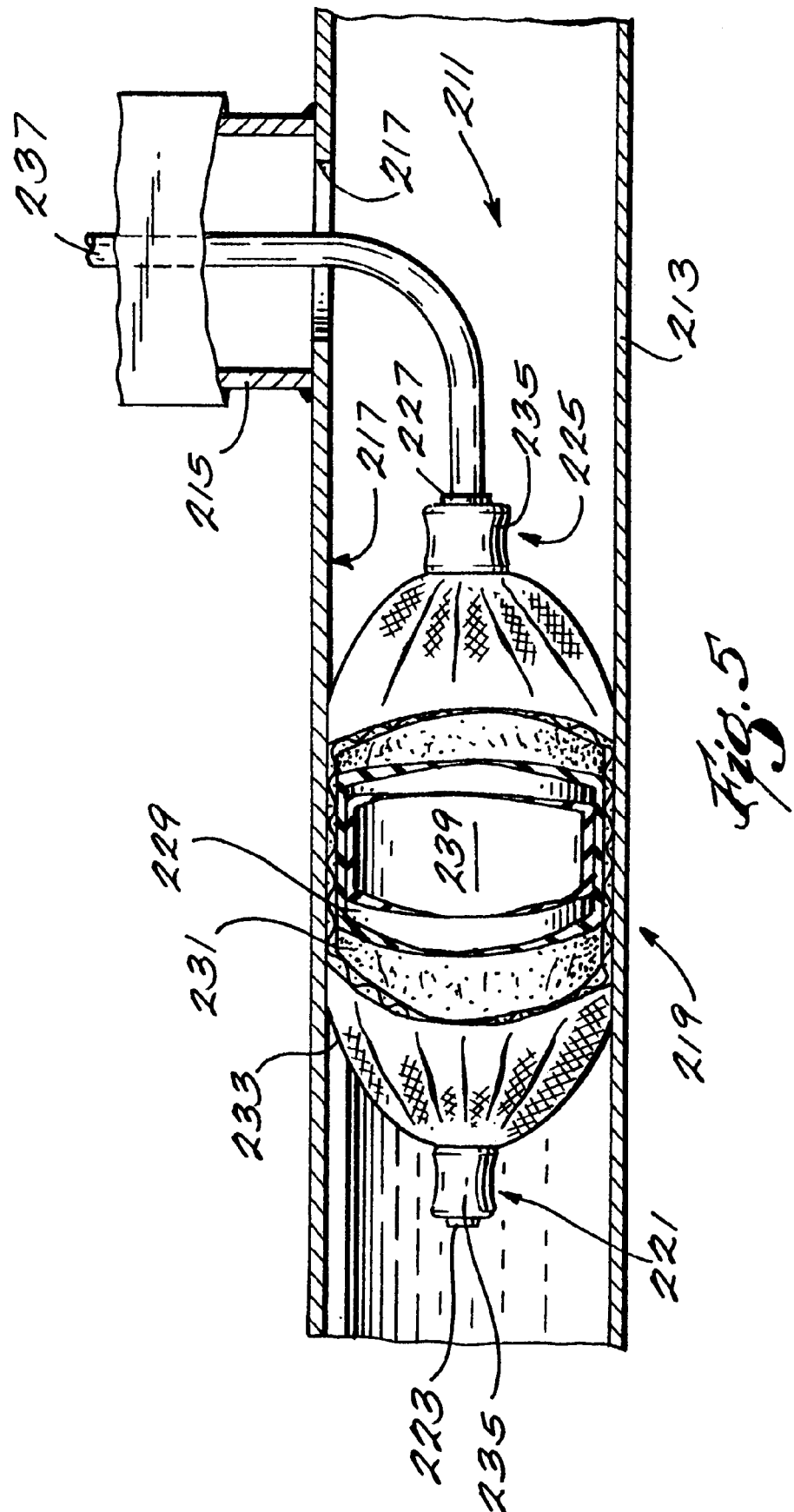
FIG. 5 is a lateral view of an alternative embodiment of a pipe sealing apparatus embodying the invention, with portions broken away.

FIG. 5 depicts an alternative embodiment of the invention. More specifically, FIG. 5 depicts a pipe sealing apparatus 211 of the standard plug type (i.e., without a flow-through conduit). The pipe sealing apparatus 211 is shown in the inflated state and situated inside a section of a pipeline 213 to isolate product in the pipeline 213. The pipe sealing apparatus 211 is inserted into the pipeline 213 in the deflated state (or at least not fully inflated) by navigating the apparatus 211 downwardly through a vertical pipe stub 215 and a hot tap opening 217 in the pipeline 213. Then, the pipe sealing apparatus 211 is turned horizontally into the pipeline 213 and moved forward in the pipeline 213 to the desired location as depicted in FIG. 5. Using a pressurized fluid supply line 237 that is in fluid communication with an internal inflatable bladder 239, the pipe sealing apparatus 211 is inflated and expanded to sealingly engage an inside surface 217 of the section of pipeline 213, as shown in FIG. 5.

The pipe sealing apparatus 211 differs from the pipe sealing apparatus 11 depicted in FIGS. 1–4 and described earlier, in that the pipe sealing apparatus 211 does not include a central flexible cylinder 45 with an open cylinder bore 55. In most other respects, however, the pipe sealing apparatus 211 has a construction similar to that of the pipe sealing apparatus 211 depicted in FIGS. 1–4, and, therefore, advantageously exhibits many of the same physical attributes and advantages described with respect to that pipe sealing apparatus 11. Two of these attributes are increased flexibility and a small-deflated diameter. These attributes facilitate the task of maneuvering the pipe sealing apparatus 211 through reduced-diameter sections of a pipeline 213 (e.g., through the hot tap opening 217) and bends in the pipeline 213.

The pipe sealing apparatus 211 includes an expandable and inflatable middle section 219, a rigid leading end 221 including a plug 223, and a rigid trailing end 225 including an open pipe 227. The middle section 219 is formed by an inflatable sleeve 229, a middle sleeve 231 surrounding the inflatable sleeve 229, and an outer sleeve 231 surrounding the middle sleeve 233. Each of the three concentric sleeves 229, 231, 233 is pleated and folded separately using the same method described earlier with respect to the pipe sealing apparatus 11 depicted in FIGS. 1–4. Further, the folded ends of the inflatable sleeve 229 are spirally-wrapped around the outer surfaces of the plug 223 and the pipe 228.

Then, the folded ends of the middle sleeve 231 are pleated, folded, and spirally-wrapped around the folded ends of the inflatable sleeve 229, and the folded ends of the outer sleeve 233 is pleated, folded, and spirally-wrapped around the folded ends of the middle sleeve 231. Finally, an aluminum band or collar 235 is placed around each folded end of the outer sleeve 223 and then swaged down to clamp and seal the sleeve ends around the plug 223 and the pipe 227 respectively.

The pressurized fluid supply line 237 is preferably a flexible rubber hose 237 that is connected to the pipe 227 of the trailing end 225 and to an external pressurized fluid supply (not shown). Thus, pressurized fluid may be delivered through the pipe 227 and into the inflatable sleeve 229 to inflate the inflatable sleeve 229 and expand the middle section 219. Since the ends of the three concentric sleeves 229, 231, 233 are pleated and folded using the method described previously, the pipe sealing apparatus 221 depicted in FIG. 5 easily collapses to a deflated state wherein the middle section 219 has a relatively small deflated diameter.

While several embodiments of the present invention have been shown and described above, alternate embodiments will be apparent to those skilled in the art and are within the intended scope of the present invention. Therefore, the invention is to be limited only by the following claims:

What is claimed is:

1. A pipe sealing apparatus insertable into a pipe and inflatable therein to restrict fluid flow through the pipe, said pipe sealing apparatus comprising:

a first support member disposed at a first end of said pipe sealing apparatus;

a second support member disposed at a second end of said pipe sealing apparatus;

an elongated inflatable sleeve including
a first inflatable sleeve end sealingly engaging said first support member;
a second inflatable sleeve end sealingly engaging said second support member;
an inner surface extending between said first and second inflatable sleeve ends, said inner surface substantially defining an expandable inflatable space therein; and
an outer surface extending between said first and second inflatable sleeve ends;

an elongated outer sleeve having
a first outer sleeve end;
a second outer sleeve end; and
an inner surface substantially surrounding said inflatable sleeve, wherein said outer surface of said inflatable sleeve is shiftable with respect to said inner surface of said outer sleeve during inflation of said inflatable space;

a first means for securing said first outer sleeve end about said first end of said pipe sealing apparatus, wherein a fluid tight seal is formed between said first support member and said first outer sleeve end;

a second means for securing said second outer sleeve end about said second end of said pipe sealing apparatus, wherein a fluid tight seal is formed between said second support member and said second outer sleeve end; and at least one elongated middle sleeve substantially surrounding said inflatable sleeve and disposed between said inflatable sleeve and said outer sleeve.

2. The pipe sealing apparatus of claim 1, wherein at least one of said first and second inflatable sleeve ends forms a set of folds wrapped around one of said first and second support members when viewed in cross sections generally perpendicular to a longitudinal axis of said one of said first and second support members.

3. The pipe sealing apparatus of claim 2, wherein at least one of said first and second outer sleeve ends forms a second set of folds wrapped around said first set of folds when viewed in cross sections generally perpendicular to said longitudinal axis.

4. The pipe sealing apparatus of claim 3, wherein said first set of folds forms a first ring of folds around said one of said first and second support members when viewed in cross sections generally perpendicular to said longitudinal axis and said second set of folds forms a second ring of folds positioned radially outward from said first ring of folds when viewed in cross sections generally perpendicular to said longitudinal axis.

5. The pipe sealing apparatus of claim 3, wherein at least one of said first and second securing means includes an annular band clampingly engaged around one of said first and second outer sleeve ends to form a fluid tight seal around one of said first and second support members.

6. The pipe sealing apparatus of claim 1, wherein said outer surface of said inflatable sleeve is shiftable with respect to said middle sleeve during inflation of said inflatable space.

7. The pipe sealing apparatus of claim 1, wherein said elongated middle sleeve is constructed of ballistic nylon material.

8. The pipe sealing apparatus of claim 1, further comprising:
   a flexible cylinder disposed substantially surrounded by said inflatable sleeve, said flexible cylinder having a first cylinder end and a second cylinder end defining an outer surface therebetween and a cylinder bore providing a fluid passage extending through said first and second ends of said pipe sealing apparatus; and
   wherein said inner surface of said inflatable sleeve and said outer surface of said cylinder substantially define said inflatable space.

9. The pipe sealing apparatus of claim 8, wherein said first support member includes a first tubular member having a first end passage therethrough and said second support member includes a second tubular member having a second end passage therethrough, said cylinder bore in fluid communication with said first end passage and said second end passage.

10. The pipe sealing apparatus of claim 1, wherein said inflatable sleeve is constructed from an elastomeric material.

11. The pipe sealing apparatus of claim 10, wherein said inflatable sleeve is constructed from a nylon material having a polyurethane coating.

12. The pipe sealing apparatus of claim 1, further comprising:
   a fluid supply inlet disposed in fluid communication with said inflatable space and operable to deliver fluid into said inflatable space to inflate said inflatable space.

13. A pipe sealing apparatus insertable inside a pipe and inflatable therein to restrict fluid flow through the pipe, said pipe sealing apparatus comprising:
   a first end;
   a second end positioned opposite said first end;
   a flexible cylinder extending between said first and second ends, said cylinder including
      a first cylinder end;
      a second cylinder end;
      a cylinder bore defined between said first and second cylinder ends, said cylinder bore providing a fluid flow passage extending through said first and second ends of said pipe sealing apparatus; and
      an outer surface defined between said first and second cylinder ends;
   an elongated inflatable sleeve substantially surrounding said outer surface of said cylinder, said inflatable sleeve having
      a first inflatable sleeve end,
      a second inflatable sleeve end,
      an outer surface extending between said first and second inflatable sleeve ends, and
      an inner surface that is movable relative to said outer surface of said cylinder during inflation to substantially define an expandable inflatable space therebetween;
   a fluid supply inlet disposed in fluid communication with said inflatable space and for delivering fluid into said inflatable space to expand said inflatable sleeve radially outward with respect to said outer surface of said cylinder;
   an elongated outer sleeve substantially surrounding said inflatable sleeve, said elongated outer sleeve having
      a first outer sleeve end,
      a second outer sleeve end, and
      an inner surface, wherein said outer surface of said inflatable sleeve is shiftable relative to said inner surface of said outer sleeve during inflation of said inflatable space;
   a first means for supporting said first outer sleeve end and said first inflatable sleeve end about said first end of said pipe sealing apparatus, whereby a fluid tight closure is formed between said outer surface of said cylinder and said first outer sleeve end;
   a second means for supporting said second outer sleeve end and said second inflatable sleeve end about said second end of said pipe sealing apparatus, whereby a fluid tight closure is formed between said outer surface of said cylinder and said second outer sleeve end; and
   at least one elongated middle sleeve disposed between said inflatable sleeve and said outer sleeve.

14. The pipe sealing apparatus of claim 13, wherein at least one of said first and second supporting means includes a support member having an outer surface and a passage therethrough, said support member being interconnected with said cylinder such that said passage is positioned in fluid communication with said cylinder bore, and wherein one of said first and second inflatable sleeve ends sealingly engages said outer surface of said support member.

15. The pipe sealing apparatus of claim 14, wherein said at least one supporting means includes an annular band clampingly engaged around one of said first and second outer sleeve ends to form a fluid tight seal between said outer sleeve end and said outer surface of said support member.

16. The pipe sealing apparatus of claim 14, wherein said one of said first and second inflatable sleeve ends forms a first set of folds wrapped around said support member when viewed in cross sections generally perpendicular to a longitudinal axis of said support member.

17. The pipe sealing apparatus of claim 16, wherein at least one of said first and second outer sleeve ends forms a second set of folds wrapped around said first set of folds when viewed in cross sections generally perpendicular to said longitudinal axis.

18. The pipe sealing apparatus of claim 17, wherein said first set of folds forms a first ring of folds around said one of said first and second support members when viewed in cross sections generally perpendicular to said longitudinal axis and said second set of folds form a second ring of folds positioned radially outward from said first ring of folds when viewed in cross sections generally perpendicular to said longitudinal axis.

19. The pipe sealing apparatus of claim 13, wherein said outer surface of said inflatable sleeve is shiftable with respect to said middle sleeve during inflation of said inflatable space.

20. The pipe sealing apparatus of claim 13, wherein said elongated middle sleeve is constructed of ballistic nylon material.

21. The pipe sealing apparatus of claim 13, wherein said inflatable sleeve is constructed from an elastomeric material.

22. The pipe sealing apparatus of claim 21, wherein said inflatable sleeve is constructed from a nylon material having a polyurethane coat.

23. A pipe sealing apparatus insertable inside a pipe and inflatable therein to restrict fluid flow through the pipe, said pipe sealing apparatus comprising:
    a first support member disposed at a first end of said pipe sealing apparatus;
    a second support member disposed at a second end of said pipe sealing apparatus;
    an elongated inflatable sleeve constructed from an elastomeric material, said inflatable sleeve including
        a first inflatable sleeve end sealingly engaging said first support member to form a first ring of folds wrapped around said first support member when viewed in cross sections generally perpendicular to a first longitudinal axis of said first support member;
        a second inflatable sleeve end sealingly engaging said second support member to form a second ring of folds wrapped around said second support member when viewed in cross sections generally perpendicular to a second longitudinal axis of said second support member;
        an inner surface extending between said first and second inflatable sleeve ends, said inner surface substantially defining an expandable inflatable space therein; and
        an outer surface extending between said first and second inflatable sleeve ends;
    a fluid supply inlet disposed in fluid communication with said inflatable space and operable to deliver fluid into said inflatable space to inflate said inflatable space; and
    an elongated outer sleeve having
        a first outer sleeve end sealingly engaged around said first ring of folds to form a third ring of folds positioned radially outward from said first ring of folds when viewed in cross sections generally perpendicular to said first longitudinal axis;
        a second outer sleeve end sealingly engaged around said second ring of folds to form a fourth ring of folds positioned radially outward from said second ring of folds when viewed in cross sections generally perpendicular to said second longitudinal axis;
        an inner surface substantially surrounding said inflatable sleeve, wherein said outer surface of said inflatable sleeve is shiftable with respect to said inner surface of said outer sleeve during inflation of said inflatable space; and
    at least one elongated middle sleeve substantially surrounding said inflatable sleeve and disposed between said inflatable sleeve and said outer sleeve.

24. The pipe sealing apparatus of claim 23, further comprising:
    at least one annular band clampingly engaged around one of said first and second outer sleeve ends to form a fluid tight seal around one of said first and second support members.

25. The pipe sealing apparatus of claim 23, further comprising:
    a flexible cylinder disposed substantially surrounded by said inflatable sleeve, said cylinder having a first cylinder end and a second cylinder end defining an outer surface therebetween and a cylinder bore providing a fluid passage extending through said first and second ends of said pipe sealing apparatus; and
    wherein said inner surface of said inflatable sleeve and said outer surface of said cylinder substantially define said inflatable space.

26. The pipe sealing apparatus of claim 25, wherein said first support member includes a first tubular member having a first end passage therethrough and said second support member includes a second tubular member having a second end passage therethrough, said cylinder bore being in fluid communication with said first end passage and said second end passage.

27. A pipe sealing apparatus insertable into a pipe and inflatable therein to restrict fluid flow through the pipe, said pipe sealing apparatus comprising:
    an inflatable sleeve at least partially defining an inflatable space;
    an intermediate sleeve substantially surrounding said inflatable sleeve; and
    an outer sleeve substantially surrounding said intermediate sleeve and said inflatable sleeve;
    whereby said inflatable sleeve, said intermediate sleeve, and said outer sleeve are shiftable with respect to each other upon inflation of said inflatable sleeve.

28. The pipe sealing apparatus of claim 27, wherein said inflatable sleeve is made of an elastomeric material.

29. The pipe sealing apparatus of claim 27, wherein said inflatable sleeve is made of a material selected from the group consisting of nylon, vinyl, Surlyn, urethane, nylon material having a polyurethane coating, and neoprene-impregnated fabric.

30. The pipe sealing apparatus of claim 27, wherein said intermediate sleeve is made of ballistic nylon.

31. The pipe sealing apparatus of claim 27, wherein said outer sleeve is made of cotton canvas.

32. The pipe sealing apparatus of claim 27, further comprising:
    an inlet in fluid communication with said inflatable space to deliver fluid into said inflatable space to inflate said inflatable space;
    a securing member securing a first end of said inflatable sleeve to said inlet member to provide a substantially fluid-tight seal between said inflatable sleeve and said inlet member.

33. The pipe sealing apparatus of claim 27 further comprising:
    a support member;
    wherein said inflatable sleeve includes a plurality of folds at one end creating an inner layer of folds, said inner layer of folds being secured around said support member to provide a substantially fluid-tight seal between said inner layer of folds and said support member.

34. The pipe sealing apparatus of claim 33, wherein said intermediate sleeve includes a plurality of folds at one end creating an intermediate layer of folds, said intermediate layer of folds being secured around said inner layer of folds to provide a substantially fluid-tight seal between said intermediate layer of folds and said inner layer of folds.

35. The pipe sealing apparatus of claim 33, wherein said outer sleeve includes a plurality of folds at one end creating an outer layer of folds, said outer layer of folds being secured around said inner layer of folds to provide a substantially fluid-tight seal between said outer layer of folds and said inner layer of folds.

36. The pipe sealing apparatus of claim 27, further comprising a flexible cylinder substantially surrounded by said inflatable sleeve, wherein said inflatable sleeve is substantially fluid-tightly sealed to an outer surface of said flexible cylinder, and wherein said inflatable space is at least partially defined between said outer surface and said inflatable sleeve.

37. The pipe sealing apparatus of claim 36, further comprising an inlet in fluid communication with said inflatable space to deliver fluid into said inflatable space to inflate said inflatable space.

* * * * *